(12) United States Patent
Breeden et al.

(10) Patent No.: US 8,099,836 B2
(45) Date of Patent: Jan. 24, 2012

(54) RATCHET TIE-DOWN

(75) Inventors: Winston Breeden, Chagrin Falls, OH (US); Robert Johnson, Montville, OH (US)

(73) Assignee: Winston Products LLC, Cleveland, OH (US)

( * ) Notice: Subject to any disclaimer, the term of this patent is extended or adjusted under 35 U.S.C. 154(b) by 580 days.

(21) Appl. No.: 12/234,065

(22) Filed: Sep. 19, 2008

(65) Prior Publication Data

US 2009/0119892 A1    May 14, 2009

Related U.S. Application Data

(60) Provisional application No. 60/973,580, filed on Sep. 19, 2007.

(51) Int. Cl.
    *B25B 25/00* (2006.01)
(52) U.S. Cl. .................................... 24/68 CD
(58) Field of Classification Search ............... 24/68 CD, 24/70 ST, 68 D, 69 ST, 69 CT, 71 ST, 71 TD, 24/909; 254/217, 218, 237, 238, 222, 223, 254/243, 256, 250–252, 257
See application file for complete search history.

(56) References Cited

U.S. PATENT DOCUMENTS

| | | | | |
|---|---|---|---|---|
| 5,560,086 | A * | 10/1996 | Huang | 24/68 CD |
| 5,904,341 | A * | 5/1999 | Norrby | 254/243 |
| 6,195,848 | B1 * | 3/2001 | Jackson et al. | 24/68 CD |
| 6,648,302 | B1 * | 11/2003 | Chou | 254/218 |
| 2003/0093884 | A1 * | 5/2003 | Doty | 24/302 |
| 2004/0181914 | A1 * | 9/2004 | Lu | 24/68 CD |
| 2005/0125959 | A1 * | 6/2005 | Hanson | 24/68 CD |

* cited by examiner

*Primary Examiner* — James Brittain
(74) *Attorney, Agent, or Firm* — Pearne & Gordon LLP

(57) ABSTRACT

A ratcheting tie-down device includes a main body portion having first and second ends, and a rotatable reel located about the second end. A dynamic webbing is extendable from the first end of the main body portion and is windable about the reel. A static webbing is coupled to the main body portion about the second end. The device includes means for attaching at least one end of the dynamic webbing to an object, and means for ratcheting rotation of the reel to wind the dynamic webbing thereon. A lever arm is rotatable relative to the main body portion between a first position and a second position to cause ratcheting rotation of the ratchet wheel. In one example, the lever arm includes at least a pair of independent lever arm rails. In another example, the dynamic webbing travels underneath a guide member prior to being wound about the reel.

20 Claims, 9 Drawing Sheets

RATCHET TIE-DOWN

RELATED APPLICATIONS

This application claims the benefit of U.S. Provisional Application No. 60/973,580, filed on Sep. 19, 2007, the entire disclosure of which is hereby incorporated herein by reference.

FIELD OF THE INVENTION

The present invention relates generally to a ratcheting tie-down for attachment to an object.

BACKGROUND OF THE INVENTION

A ratcheting tie-down device can be used to secure a wide variety of objects to various support surfaces and/or to various other objects. Conventionally, a ratcheting tie-down device has a ratcheting mechanism and a webbing with at least one extendable end. In one example, a ratcheting tie-down device can include two webbing assemblies, including one webbing assembly of a fixed, non-extendable length and another webbing assembly that is extendable to make the ratcheting tie-down adjustable to a wide variety of lengths. The distal ends of both webbing assemblies can be attached to suitable anchor points on an object or surface. The ratcheting mechanism can then be used to remove any slack in the webbing assemblies and apply tension to ensure that the object to be secured is retained securely. However, several problems can occur in conventional ratcheting tie-down devices. In one example, conventional tie-down devices require the user to push upwards on the handle of the ratcheting mechanism for retraction and tensioning of the webbing. This can result in a loss of leverage that can make the ratcheting tie-down be unwieldy and/or be difficult to use. Accordingly, it would be beneficial to provide a ratcheting tie-down device that can overcome the aforementioned problems.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with an aspect of the present invention, a ratcheting tie-down device is provided. The device includes a main body portion having a first end and a second end. The device further includes a reel for rotation relative to the main body portion about an axis. The reel is located about the second end of the main body portion. The device further includes a dynamic webbing for winding about the reel, and the dynamic webbing is extendable from the first end of the main body portion. The device further includes means for attaching at least one end of the dynamic webbing to an object, and means for ratcheting rotation of the reel to wind the dynamic webbing onto the reel. The means for ratcheting has an operational condition in which ratcheting rotation can occur and a non-operational condition in which ratcheting rotation cannot occur. The device further includes a static webbing coupled to the main body portion about the second end, and a first guide member coupled to the main body portion about the first end. The first guide member extends at least partially across the first end such that the dynamic webbing travels underneath the first guide member prior to being wound about the reel.

In accordance with another aspect of the present invention, a ratcheting tie-down device is provided. The device includes a main body portion including a first end and a second end. The device further includes a reel rotatable relative to the main body portion about an axis. The reel is located about the second end of the main body portion. The device further includes a dynamic webbing windable about the hub. The dynamic webbing is extendable from the first end of the main body portion. The device further includes means for attaching at least one end of the dynamic webbing to an object, and a static webbing secured to the main body portion about the second end. The device further includes a ratchet wheel having a plurality of ratchet teeth. The ratchet wheel is rotatable relative to the main In accordance with yet another aspect of the present invention, a ratcheting tie-down device is provided. The device includes a main body portion having a first end and a second end, and a reel for rotation relative to the main body portion about an axis. The reel is located about the second end of the main body portion. The device further includes a dynamic webbing for winding about the reel. The dynamic webbing is extendable from the first end of the main body portion. The device further includes means for attaching one end of the dynamic webbing to an object, wherein the other end of the dynamic webbing includes a handle for grasping by a user. The device further includes means for ratcheting rotation of the reel to wind the dynamic webbing onto the reel. The means for ratcheting has an operational condition in which ratcheting rotation can occur and a non-operational condition in which ratcheting rotation cannot occur. The device further includes a static webbing coupled to the main body portion about the second end, and a lever arm including a grip portion and being rotatable relative to the main body portion about the axis between a first position and a second position to cause ratcheting rotation of the means for ratcheting. The lever arm includes at least a pair of independent lever arm rails that are coupled together about the grip portion, and wherein each of the independent lever arm rails are independently coupled to the reel.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
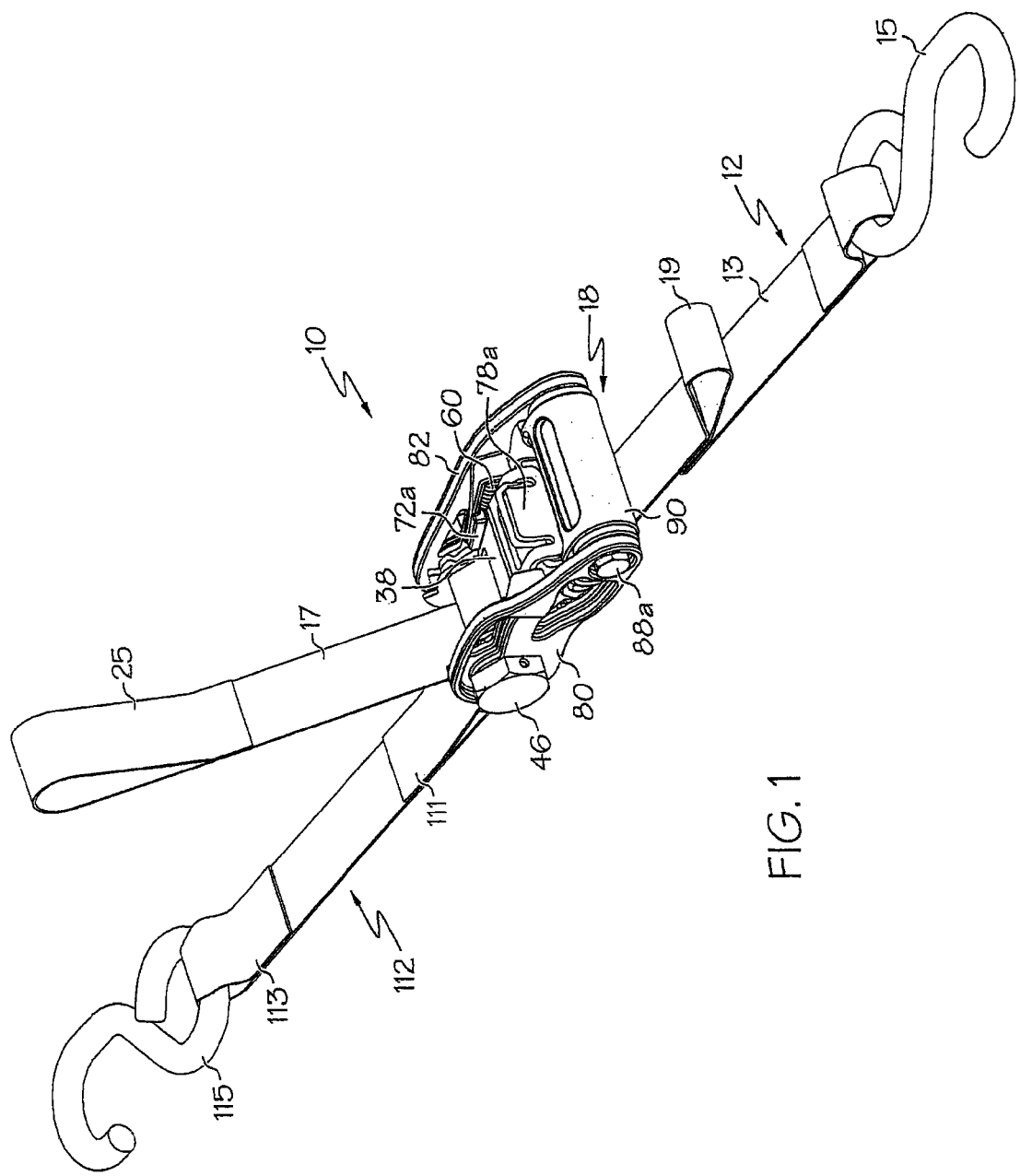
FIG. 1 is a perspective view of an example ratcheting tie-down device in accordance with an aspect of the present invention.

An example embodiment of a device that incorporates aspects of the present invention is shown in the drawings. It is to be appreciated that the shown example is not intended to be a limitation on the present invention. For example, one or more aspects of the present invention can be utilized in other embodiments and even other types of devices.

Turning to the shown example of FIG. 1, an example ratcheting tie-down device 10 is provided. The tie-down device 10 is shown generally in a storage position such that a length of dynamic webbing 12 is wound substantially completely about a reel 14 (see FIG. 2), though it is to be appreciated that a portion of the dynamic webbing 12 can still extend a distance from the tie-down device 10. It is to be understood that the phrase "dynamic webbing" refers to webbing that can be selectively wound about the reel 14, and/or selectively extended various distances from the device 10.

Figure 2:
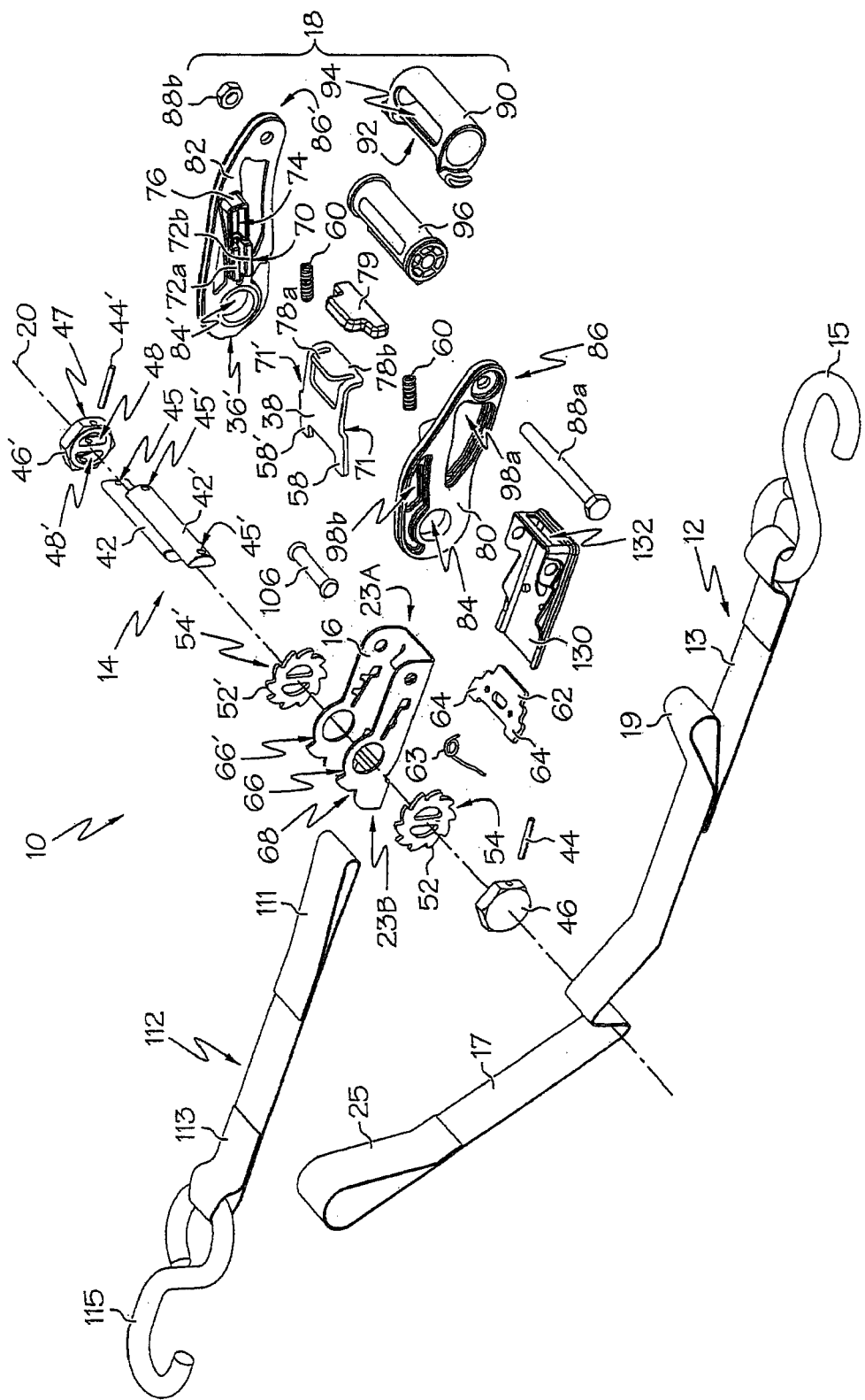
FIG. 2 is similar to FIG. 1, but shows an exploded view of the ratcheting tie-down device.

As shown in FIGS. 1-2, the example ratcheting tie-down device 10 includes a main body portion 16. The main body portion 16 can provide a centralized component for mounting the various elements of the tie-down device 10 thereto. The main body portion 16 can include a generally rigid material, such as metal, plastic, or the like, and can be formed in various manners. As shown, the main body portion 16 can include a metal material, such as steel or brass, which can be formed using various hot or cold-working processes, such as stamping, bending, drilling, casting, or the like. In addition or alternatively, the main body portion 16 can also be formed from a molding process, or can even be formed from a plurality of elements that can be attached together in various manners, such as through fasteners, adhesives, welding, or the like. The main body portion 16 can have a first end 23A and a second end 23B. As shown, the reel 14 can be located generally about the second end 23B of the main body portion 16.

As stated previously and shown in FIG. 2, the ratcheting tie-down device 10 can further include the dynamic webbing 12 for winding about the reel 14 (i.e., the wraps of the webbing go around the hub). The dynamic webbing 12 can also be extended a selected distance from the tie-down device 10 as needed for attachment to various objects, support surfaces, etc. As shown, the dynamic webbing 12 can be extendable from the first end 23A of the main body portion 16. The dynamic webbing 12 can include a strap or the like that can include various materials having a sufficient strength for securing various objects, such as a nylon webbing or the like. Additionally, the strap can have various lengths, such as 5 feet, 10 feet, or 20 feet, though various other distances are also contemplated to be within the scope of this disclosure. The dynamic webbing 12 can be non-disjoint and formed from a uniform piece of material, or it can also include various sections joined together in various manners. Further, the dynamic webbing 12 can include two ends, one end 13 being extendable from main body portion 16, and the other end 17 (i.e., a tail end) being attachable to the reel 14 and/or extendable through the reel 14, as will be discussed more fully herein.

Additionally, the extendable end 13 of the dynamic webbing 12 can also include means for attaching 15 the end 13 to an object, supporting surface, etc. (see FIG. 8). In one example, the means for attaching 15 can include a hook, though various other coupling elements can also be used, such as straps, loops, clips, clasps, magnets, hitches, or the like. The means for attaching 15 can be either removably or non-removably connected to the dynamic webbing 12 in various manners. For example, the hook can include an eye through which a portion of the dynamic webbing 12 can be received. The dynamic webbing 12 can then be folded over on itself and attached to another portion of the webbing in various manners, such as by adhesives, stitching, welding, or the like.

Figure 7:
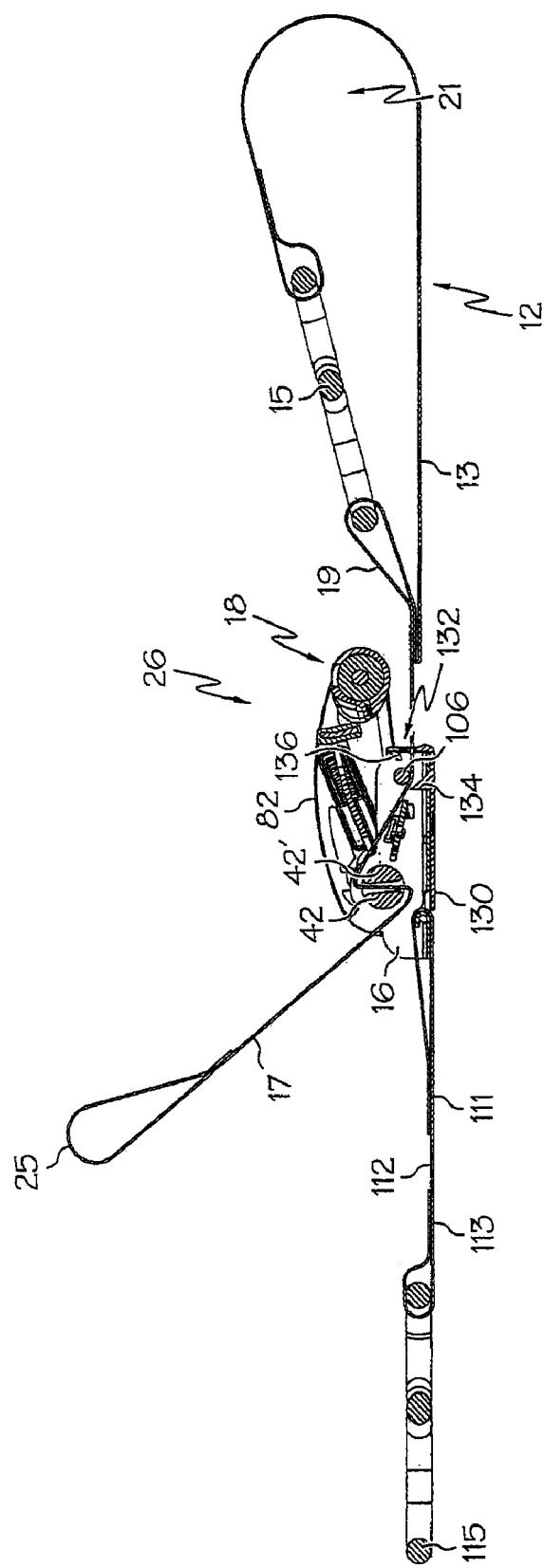
FIG. 7 is similar to FIG. 4, but shows an example alternative means for attaching the dynamic webbing to an object.

In addition or alternatively, turning briefly to FIG. 7, the dynamic webbing 12 can provide an optional, "soft attachment" loop 21 for attaching to various objects that may otherwise be damaged by a hardened, rigid coupler or the like. As before, the dynamic webbing 12 can include the hook 15 or the like coupled to the end 13 of the dynamic webbing 12, and corresponding attachment structure 19 spaced a distance from the end 13. The corresponding attachment structure 19 can be removably or non-removably coupled to the end 13, and can be configured to be removably coupled to the hook 15 or other rigid coupler. In one example, as shown, the corresponding attachment structure 19 can be formed from a portion of the dynamic webbing 12 that has been folded and attached to itself (i.e., such as by adhesives, stitching, welding, or the like) to form an opening to facilitate attachment and removal of the hook 15 therefrom. Thus, a "soft attachment" loop 21 is formed by a portion of the dynamic webbing 12 when the hook 15 is wrapped around and coupled to the corresponding attachment structure 19. It is to be understood that the corresponding attachment structure 19 can be formed in various other manners, such as by an additional loop element or the like being coupled to the dynamic webbing 12. Moreover, a plurality of corresponding attachment structures (not shown) can similarly be provided to enable various "soft attachment" loops having various sizes.

The ratcheting tie-down device 10 can also include means for ratcheting rotation of the reel 14 to wind the dynamic webbing 12 onto the reel 14. The means for ratcheting can include various elements, such as a lever arm 18 rotatably (i.e., rotatable through an arc to pivot) attached to the main body portion 16, ratchet wheels 52, 52', rotational lock element 38, lock member 62 and/or various associated components, to drive the rotation of the reel 14.

Turning back to FIGS. 1 and 2, the reel 14 can be disposed within an interior area of the main body portion 16 and located generally about the second end 23B thereof. The reel 14 can include a single body, or it can be formed of multiple pieces, such as a pair of reel elements 42, 42'. As used herein, similar or identical structure is noted with a prime designation (e.g., """). Thus, the two reel elements 42, 42' can be substantially similar, as shown, though they can also each include specific features. The two reel elements 42, 42' can be attached using various methods, such as adhesives, welding, snap fittings, fasteners, or the like. In the shown example, the two reel elements 42, 42' can be attached through one or more fasteners 44, 44' extending through holes 45, 45' formed through each of the reel elements 42, 42'. Various fasteners 44, 44' can be used, such as spring pins (as shown), cotter pins, bolts, etc. As shown, the holes 45, 45' can be located generally towards the ends of the reel elements 42, 42' so as to be disposed generally outward of the ratchet wheels 52, 52', though various other configurations are also contemplated.

In addition or alternatively, end caps 46, 46' can be disposed on the ends of the reel elements 42, 42', such as for maintaining positioning of the reel elements 42, 42' relative to each other. For example, either or both of the end caps 46, 46' can include apertures 48, 48' extending partially into or completely therethrough for receiving a portion of the reel elements 42, 42'. In the shown example, the apertures 48, 48' can be spaced a distance apart, such as by an intermediate wall or the like, to as to maintain the reel elements 42, 42' spaced a distance apart from each other to form a reel aperture 49 (see FIG. 4) sized and shaped so that the dynamic webbing 12 can extend through. The end caps 46, 46' can also include holes 47, 47' or the like for receiving the fasteners 44, 44'. Thus, the end caps 46, 46' can rotate together with the reel elements 42, 42'. It is to be understood that the end caps 46, 46' can have various geometries.

The ratcheting tie-down device 10 can further include various elements for winding the dynamic webbing 12 about the reel 14. In one example, the ratcheting tie-down device 10 can include a ratchet wheel 52 or the like having a plurality of ratchet teeth 54. As shown in FIG. 2, the tie-down device 10 can include a pair of ratchet wheels 52, 52' each having a plurality of teeth 54, 54', though various numbers of ratchet wheels are contemplated. As before, similar or identical structure is noted with a prime designation (e.g., """). Further still, similar to the end caps 46, 46' described above, either or both of the ratchet wheels 52, 52' can include recesses or holes to receive the one or more reel elements 42, 42'. Thus, the ratchet wheels 52, 52' can each rotate together with the reel 14. Additionally, as shown in FIG. 3B, each ratchet wheel 52, 52' can be located generally adjacent the main body portion 16, though other placements are also contemplated. Still further, the ratchet wheels 52, 52', or more specifically the ratchet teeth 54, 54', can be combined into the reel 14.

The ratchet wheels 52, 52' are rotatable relative to the main body portion 16 about the rotational axis 20 generally together with the lever arm 18. Because the ratchet wheels 52, 52' can rotate together with the lever arm 18, the respective rotational axes are intended to be coaxial. Still, in reality, it is to be appreciated that the respective rotational axes can be geometrically coaxial, or alternatively, can also be slightly misaligned due to various considerations, such as manufacturing tolerances, wear, age, etc. However, for ease of discussion, these rotational axes can be referred to as a single axis 20 with the understanding such possible slight misalignment may be present. Also, rotation of any of the reel 14, lever arm 18, and/or ratchet wheels 52, 52' can cause corresponding rotation of the other components.

Figure 5:
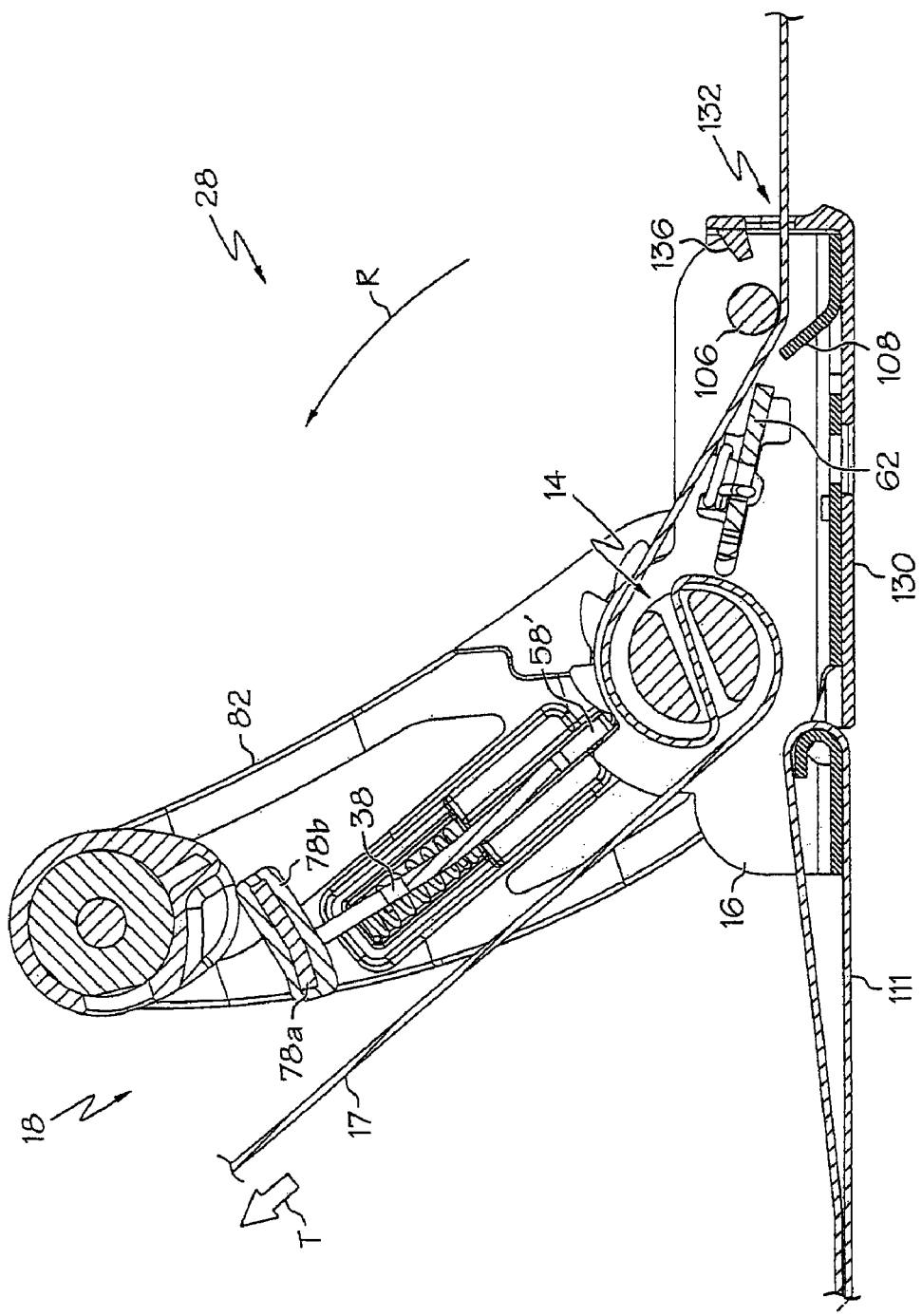
FIG. 5 is similar to FIG. 4, but shows the lever arm in an example second position.

In one example, as shown in FIG. 5, the tie-down dynamic webbing 12 can be wound on the reel 14 so that it progressively wraps about itself to form a spiral roll or doubly-wound roll. With regard to specific structures, it is to be appreciated that the shown embodiments are only examples and that various different structures are possible. So, the reel 14 can have a generally tubular geometry to permit the dynamic webbing 12 to wind thereon. In another example, the reel 14 can be configured to grasp, such as through a clamp, teeth, or the like (not shown), a portion of the end of the dynamic webbing 12. In addition or alternatively, interior walls of the main body portion 16 and/or the ratchet wheels 52, 52' can act as sidewalls configured to retain the tie-down dynamic webbing 12 as it is wound about the reel 14. For example, as shown in FIG. 3B, the sidewalls can be spaced a distance apart from each other to provide proper alignment of the dynamic webbing 12 relative to the main body portion 16 to thereby facilitate generally consistent winding and unwinding of the dynamic webbing 12 relative to the reel 14.

Figure 4:
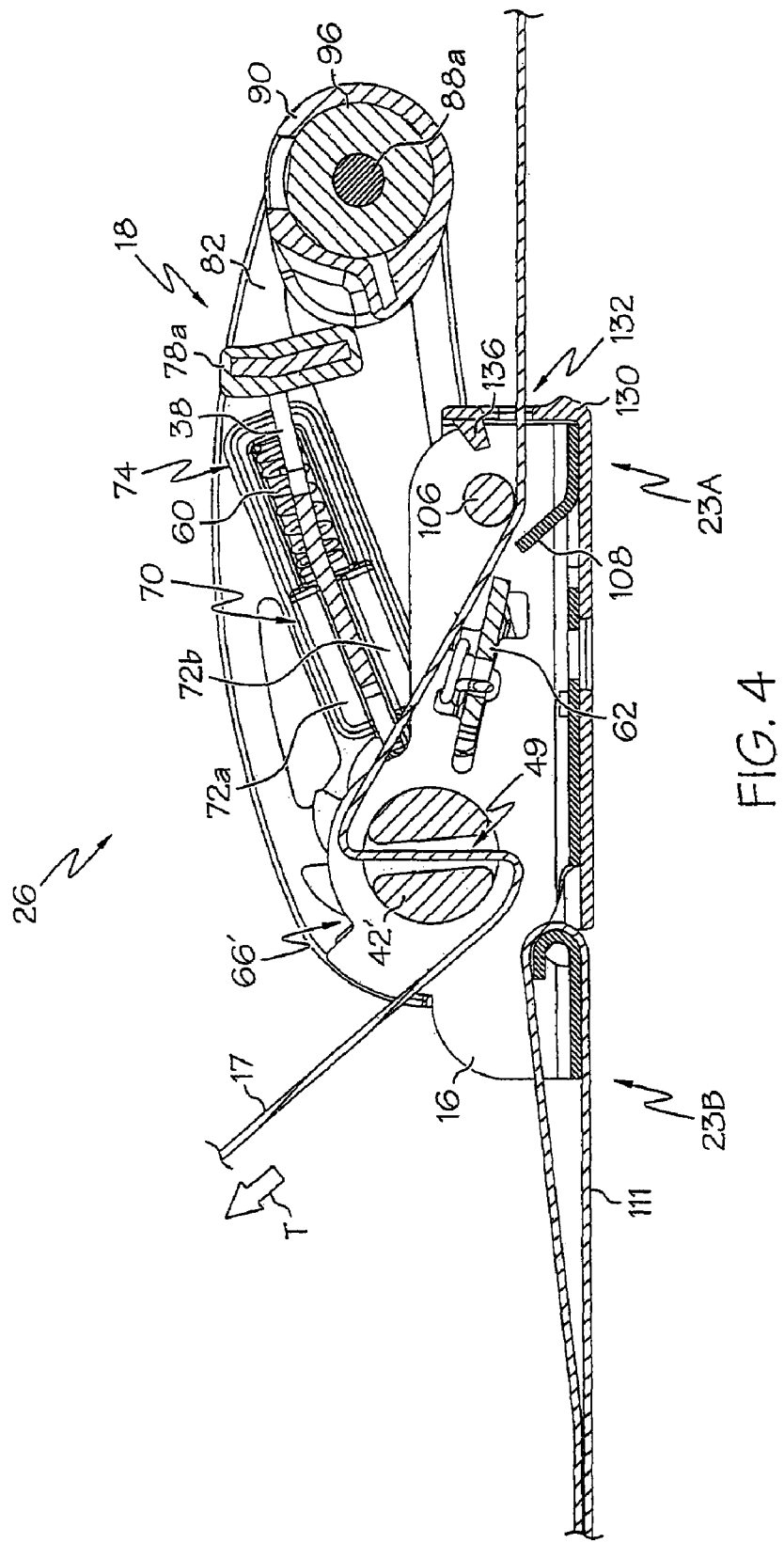
FIG. 4 is a side sectional view along line 4-4 of FIG. 3B with the webbing shown and an example lever arm in an example first position.
Figure 6:
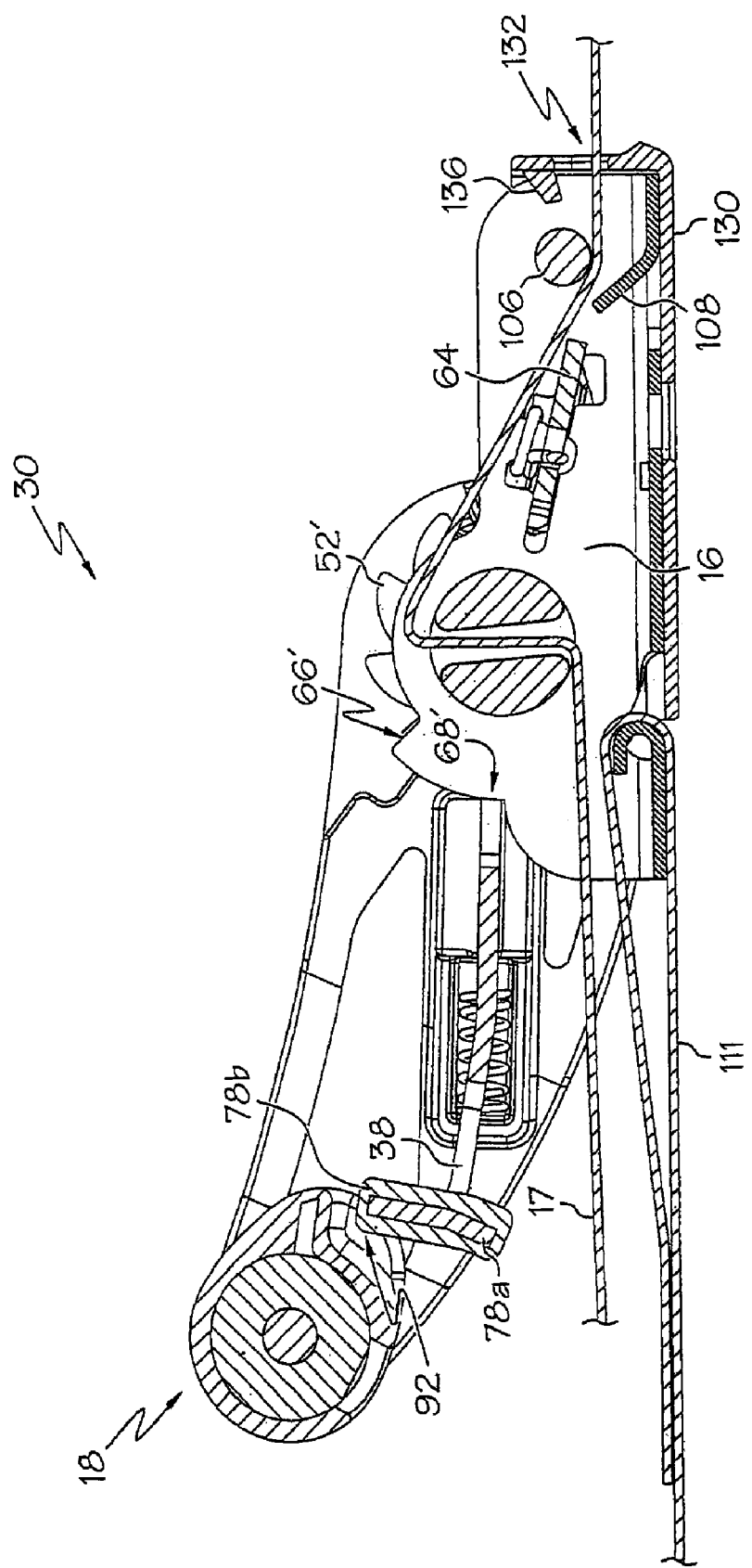
FIG. 6 is similar to FIG. 4, but shows the lever arm in an example third position.

Turning back to FIG. 2, means for ratcheting can the lever arm 18 rotatably (i.e., rotatable through an arc to pivot) attached to the main body portion 16. The lever arm 18 can be rotatably attached to the main body portion 16 through the reel 14, and can be rotatable relative to the main body portion 16 about a rotational axis 20. The lever arm 18 can be rotatable between various positions, as shown in FIGS. 4-6, such as a first position 26, second position 28, and/or even a third position 30, though other positions are contemplated.

The lever arm 18 can be formed as a monolithic element, or alternatively as shown in FIG. 2, can be formed of a plurality of elements. For example, the lever arm 18 can include at least a pair of independent lever arm rails 80, 82 that can be generally similar or identical (and may even be mirror images of each other), or can have various differences. Each of the pair of independent lever arm rails 80, 82 can be independently coupled to the reel 14, such as by holes 84, 84' extending therethrough for receiving the reel 14. As used herein, similar or identical structure is noted with a prime designation (e.g., """). As shown, the holes 84, 84' can have a cross-sectional area generally larger than that of the reel 14 so as to permit the reel 14 to rotate freely therein. In addition or alternatively, the holes 84, 84' can include various rotational supports (i.e., bushings, bearings, etc., not shown) for rotational engagement with the reel 14. In addition or alternatively, the holes 84, 84', or even other structure of the lever arm rails 80, 82 can include other structure for coupling to the reel 14.

The independent lever arm rails 80, 82 can be coupled together variously so as to rotate together. In one example, the independent lever arm rails 80, 82 can be coupled together at an end 86, 86' spaced a distance from the reel 14. For example, the independent lever arm rails 80, 82 can be coupled together by various fasteners, such a nut 88a and bolt 88b, or the like. In addition or alternatively, the lever arm 18 can include a grip portion 90 located generally about the end 86, 86' and extending generally between the independent lever arm rails 80, 82. The grip portion 90 can be formed of various materials and/or include various surface features to facilitate gripping by a user. In one example, the grip portion 90 can include plastic, rubber, or the like, and may include a recess 92, projections, or the like for accommodating the fingers of the user. In another example, the grip portion 90 can include an area 94 for indicia, symbols, instructions, logos, etc. The various fasteners 88a, 88b can extend generally through the grip portion 90 for coupling to the independent lever arm rails 80, 82. In addition or alternatively, a reinforcing support 96 can extend on or within the grip portion 90 to provide additional structural support for the grip portion 90, or even for the various fasteners 88a, 88b.

The independent lever arm rails 80, 82 can be formed of various materials. In one example, the independent lever arm rails 80, 82 can be formed of aluminum, though various other generally rigid materials (other metals, plastics, hard rubbers, material combinations, etc.) can also be utilized. It is to be understood that the lever arm 18 can be formed in various manners using various materials, including to those manners and materials discussed previously herein regarding the main body portion 16. In addition or alternatively, so as to reduce weight and/or cost, various cut-outs 98a, 98b can extend partially or completely through each of the independent lever arm rails 80, 82. In addition or alternatively, the independent lever arm rails 80, 82 can be formed using various hot or cold-working processes, such as stamping, bending, molding, drilling, casting, or the like.

It is to be understood that although described as including a separate grip portion 90, either or both of the independent lever arm rails 80, 82 can include an integral grip portion (not shown). In one example, each of the independent lever arm rails 80, 82 can include half of an integral grip portion, such that the assembled lever arm 18 provides a completed integral grip portion. In addition or alternatively, the independent lever arm rails 80, 82 can be coupled together by cooperating structure formed with the grip portion, such as corresponding male and female structure, adhesives, welding, or the like that may or may not utilize additional fasteners or the like. In still other examples, the independent lever arm rails 80, 82 can be formed together. In addition or alternatively, the lever arm 18 can also include one or more cams 36, 36' (only 36' shown for clarity) located about a peripheral edge of the lever arm 18, and/or can include a rotational lock element 38, each of which will be discussed more fully herein.

Figure 3A:
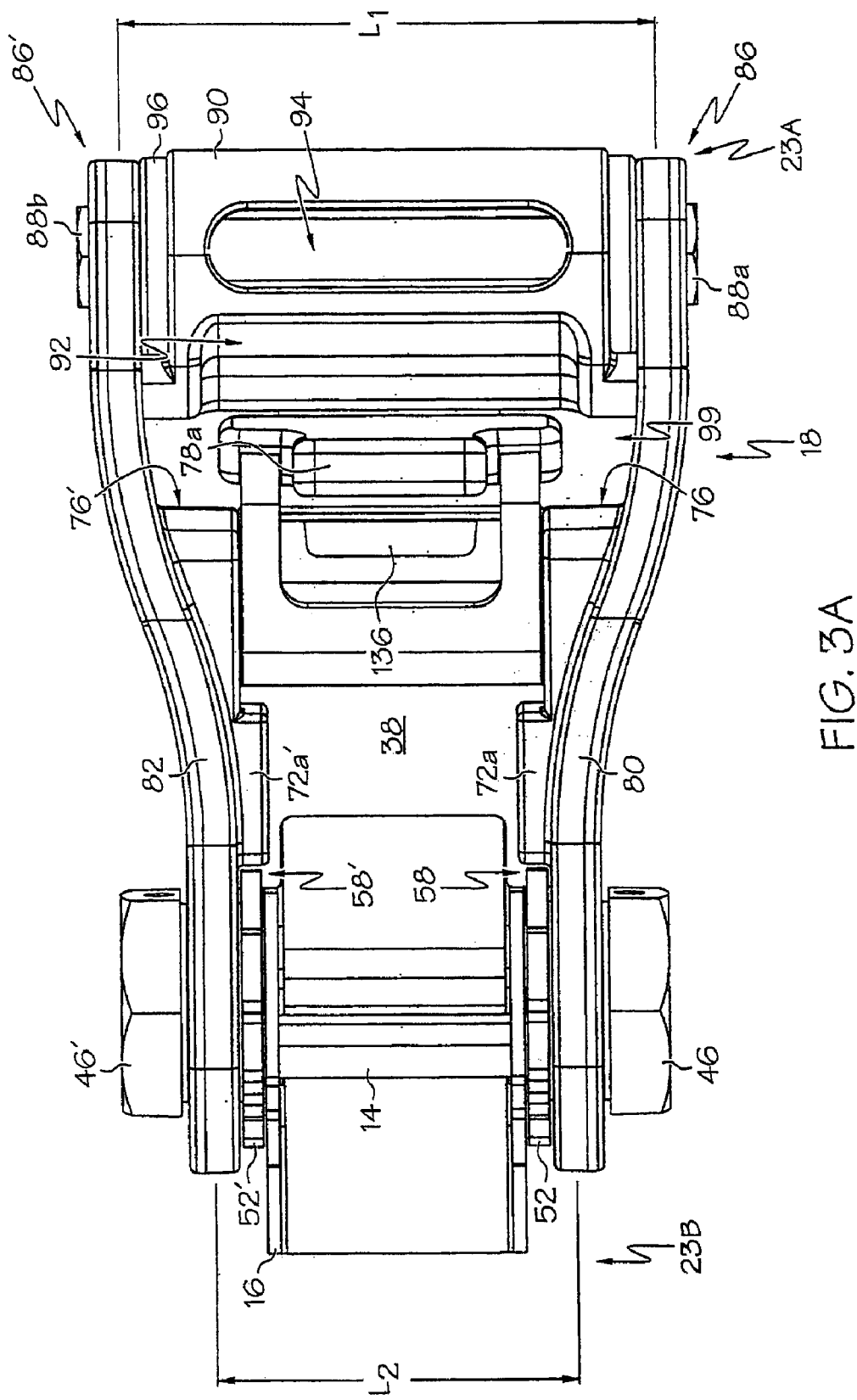
FIG. 3A is a top view of the ratcheting tie-down device of FIG. 1 with the webbing not shown for clarity.
Figure 3B:
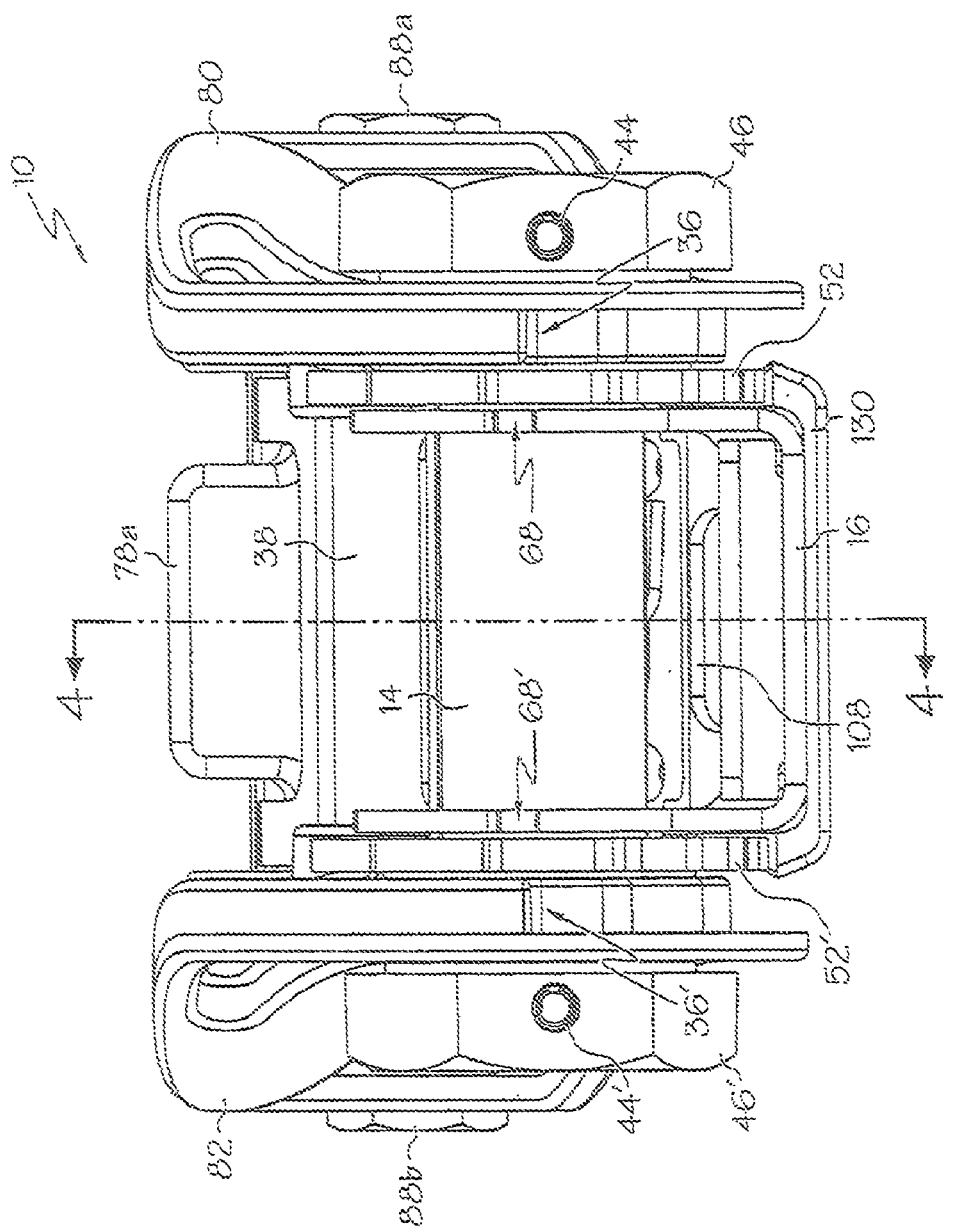
FIG. 3B is a rear view of the ratcheting tie-down device of FIG. 1 with the webbing not shown for clarity.

Turning now to FIG. 3A, the lever arm 18 can further include various other features. For example, the lever arm 18 can include a generally enlarged handle portion 99 generally near the end 86, 86' to facilitate the size of a user's hand for movement of the lever arm 18 among the various positions 26-30. Thus, as shown, the spacing $L_2$ between an end of the independent lever arms 80, 82 located generally near the reel 14 can be relatively less than the spacing $L_1$ between the other end of the lever arm rails 80, 82 located near the ends 86, 86'. Each of the independent lever arms 80, 82 can have a generally straight geometry, or as shown, can have a curved geometry. Similarly, the relatively amount of spacing increase between the independent lever arms 80, 82 can change generally linearly, or as shown, can change by relatively increasing or decreasing rates. It can be beneficial to form the independent lever arms 80, 82 out of a cast or molded, rigid metal, such as aluminum, that has sufficient structural strength and/or rigidity to maintain the generally enlarged handle portion 99 and withstand the load of the reciprocating ratcheting action of the device 10. Still, as described herein, various other materials and/or manufacturing techniques can also be used. In addition or alternatively, as shown in FIG. 4, the end 86, 86' of the lever arm 18 can extend relatively forward of, and even overhang, the first end 23A of the main body portion 16 to provide an increased area for receiving a hand of a user.

The tie-down device 10 can further include the rotational lock element 38 that, in cooperation with the ratchet wheels 52, 52', can include at least one rotational lock arm 58 for engagement with at least one ratchet tooth of the plurality of ratchet teeth 54, 54' to drive the rotation of the ratchet wheels 52, 52' to wind the dynamic webbing 12 about the reel 14. For example, as shown, the rotational lock element 38 can include a pair of lock arms 58, 58' for engagement with the respective ratchet wheels 52, 52'. As shown in FIGS. 1-4, the rotational lock element 38 can be retained by the lever arm 18. For example, each of the independent lever arm rails 80, 82 can include a guide channel 70 that is arranged to retain the rotational lock 38 while permitting relatively longitudinal movement thereof. The guide channel 70 can be coupled to or even formed with either or both of the independent lever arm rails 80, 82. For example, as shown, the guide channel 70 can include a pair of spaced protrusions 72a, 72b arranged to define the channel 70 therebetween. The rotational lock element 38 can have a correspondingly wider geometry, such as about the region of the lock arms 58, 58', for sliding engagement with the guide channel 70. In one example, the relatively wider geometry can form one or more shoulders 71, 71' or the like. Still, the rotational lock element 38 can have various geometries that may remain constant (i.e., a constant width) or change variously (i.e., a variable width).

Additionally, the rotational lock element 38 can be resiliently biased into engagement with the ratchet teeth 54, 54' by way of one or more biasing elements, such as one or more springs 60 or the like, retained between the lever arm 18 and the rotational lock element 38. Various types of springs 60 can be used, such as torsion springs, tension/extending springs, compression springs, leaf springs, spiral springs, etc. As shown in FIGS. 1-4, one or more of the springs 60 can be retained by the lever arm 18. For example, each of the independent lever arm rails 80, 82 can include a pocket 74 configured to maintain at least one spring 60 therein. As shown, the pocket 74 can be at least partially enclosed and at least partially defined a top wall 76 that can provide a surface against which a force of the spring 60 can react. Another portion of the pocket 74, such as a portion generally opposite the top wall 76 (i.e., a bottom wall or the like), can remain generally open and in communication with the guide channel 70 such that a portion of the rotational lock element 38 can engage the spring 60. For example, the shoulders 71, 71' of the rotational lock element 38 can be coupled to or in engagement with the springs 60 via the generally open portion so as to permit the biasing force of the springs 60 to act thereon. It can be beneficial to provide each of the independent lever arms 80, 82 with a biasing member, such that a relatively more even biasing force is applied to the rotational lock element 38 so as to inhibit, such as prevent, misalignment, binding, etc. that can occur during use. Moreover, the rotational lock element 38 can be independent from, and even spaced a distance from, the grip portion 90 of the lever arm 18. Additionally, the geometry of the generally enlarged handle portion 99 can provide physical space to facilitate inclusion of either or both of the guide channel 70 and pockets 74 with the device 10. Still, the biasing element(s) can even be formed with the rotational lock element 38.

In addition or alternatively, the rotational lock element 38 extends generally along a longitudinal axis (as described above) and can include one or more handles arranged variously thereon. For example, shown, the rotational lock element 38 can include a plurality of handles 78a, 78b located generally at the end spaced away from the reel 14. Each of the plurality of handles 78a, 78b can extend generally away from each other and at an angle, respectively, to the longitudinal axis of the rotational lock element 38. For example, as shown, each of the handles 78a, 78b can be generally opposed to each other and can extend generally perpendicular relative to the longitudinal axis of the rotational lock element 38. Thus, the rotational locking element 38 can be operated by the hand of a user from either side of the lever arm 18, facilitating use of the ratcheting device 10 in various orientations. In addition or alternatively, the handles 78a, 78b can include one or more protective members 79 (e.g., plastic, rubber, etc.) arranged thereon. Moreover, the recess 92 of the grip portion 90 can be configured to at least partially receive a portion of the handles 78a, 78b.

The one or more springs 60 can bias the rotational lock element 38 towards and into engagement with the ratchet wheels 52, 52'. As such, the rotational lock arms 58 can act as a pawl with respect to the ratchet teeth 54. That is, when the lever arm 18 is rotated in one direction, such as from the first position 26 to the second position 28, the rotational lock arms 58 will contact the ratchet teeth 54 and drive the rotation of the ratchet wheels 52, 52' to wind the dynamic webbing 12 about the reel 14. Correspondingly, when the lever arm 18 is rotated in the opposite direction, such as from the second position 28 to the first position 26, the resilient bias of the rotational lock element 38 will permit the rotational lock arms 58 to move past the ratchet teeth 54 without causing rotation of the ratchet wheels 52, 52'.

Thus, when it is desired to wind the dynamic webbing 12 about the reel 14 in an incremental manner, a user can utilize the means for ratcheting, including the lever arm 18, ratchet wheels 52, 52', rotational lock element 38, and/or various associated components, to drive the rotation of the reel 14. To drive the ratchet wheels 52, 52', a user can operate the lever arm 18 in the direction of arrow R between the first position 26, as shown in FIG. 4, and the second position 28, as shown in FIG. 5, repeatedly until a desired retraction of the dynamic webbing 12 has been achieved. In this manner, a user can wind the dynamic webbing 12 about the reel 14 in a relatively slower, incremental manner to remove slack from the dynamic webbing 12 and/or to gradually apply tension to the dynamic webbing 12 for securing an object or the like.

In addition or alternatively, a user can apply a tension force to a portion of the dynamic webbing 12 to stabilize or otherwise facilitate winding of the webbing 12 onto the reel 14. For example, as discussed herein, the other end 17 of the dynamic webbing 12 (i.e., the end without the means for attaching 15) can be extendable through the aperture 49 of the reel 14 such that the end 17 protrudes a distance from the second end 23B. A user can grasp the end 17 and apply a tension force T thereto to stabilize the ratchet device 10 and/or reduce, such as eliminate, slack that may occur within the dynamic webbing 12. As a result, the means for attaching 15 can be inhibited, such as prevented, from inadvertently disconnecting from the object that it is coupled to. Because the dynamic webbing 12 is variably extendable and retractable from the first end 23A of the main body portion 16, the lever arm 18 is generally pulled towards the user in the direction of arrow R, which can provide relatively increased leverage and/or stability. Thus, the user is generally located behind the main body portion 16 (i.e., towards the second end 23B), and as a result, can apply the tension force T by pulling the other end 17 of the webbing 12 towards the user's body. Moreover, where the main body portion 16 is located vertically at or above the user, the user can advantageously allow the force of gravity to form a portion of the tension force T, or even the force required to rotate the lever arm 18 in the direction of arrow R, which can thereby reduce the amount of force provided by the user. In addition or alternatively, the other end 17 of the webbing 12 can include a handle 25, including various types of handles coupled thereto, or even formed from a portion of the end 17 of the dynamic webbing 12 that has been folded and attached to itself (i.e., such as by adhesives, stitching, welding, or the like) to form the handle 25.

In cooperation with the rotational lock element 38 and the ratchet wheels 52, 52', the tie-down device 10 can further include a lock member 62 that is resiliently biased into locking engagement with at least one ratchet tooth of the plurality of ratchet teeth 54, 54' to inhibit unwinding of the dynamic webbing 12 about the reel 14. The lock member 62 can be resiliently biased into locking engagement with a ratchet tooth by way of a biasing member, such as a spring 63 or the like that can be coupled to the main body portion 16. For example, the spring 63 can be disposed between the main body portion 16 and the lock member 62, though other spring locations are also contemplated. Further, the lock member 62 can include one or more lock member arms 64 for engagement with the ratchet teeth 54, 54' on each wheel 52, 52'.

Thus, the means for ratcheting can also include the lock member 62, and the lock member 62 can adjust the means for ratcheting between an operational condition and a non-operational condition. In the operational condition, the lock member 62 is in locking engagement with at least one ratchet tooth 54, 54'. For example, similar to the rotational lock element 38, the lock member arms 64 can act as pawls with respect to the ratchet teeth 54, 54'. That is, when the lever arm 18 is rotated in one direction, such as from the second position 28 to the first position 26, the resilient bias of the lock member 62 will permit the lock member arms 64 to move past the ratchet teeth 54 without inhibiting rotation of the ratchet wheels 52, 52'. However, when the lever arm 18 is rotated in the opposite direction (e.g., from the first to the second positions 26, 28), or when the tie-down device 10 is stationary, the lock member arms 64 will contact the ratchet teeth 54 to inhibit reverse rotation of the ratchet wheels 52, 52'. Thus, when the lock member arms 64 are engaged, rotation of the ratchet wheels 52, 52', reel 14, and the like will be inhibited, such as even prevented, to thereby inhibit, such as prevent, the dynamic webbing 12 from unwinding about the reel 14. As such, because the dynamic webbing 12 is inhibited from unwinding, the lock member 62 can permit the tie-down device 10 to maintain tension within the dynamic webbing 12 when it is attached to an object or the like.

However, when it is desired to unwind the dynamic webbing 12 from the reel 14, such as when attaching it to an object or the like, the lock member 62 must be disengaged from the ratchet wheels 52, 52' (e.g., the means for ratcheting adjusted to the non-operational condition). The lock member 62 can be disengaged in various manners. In one example, as shown in FIG. 6 and briefly described herein, the lever arm 18 can further include one or more cams 36, 36' for selective engagement with the lock member 62. Selective engagement of the cam 36 with the lock member 62 can permit selective adjustment of the means for ratcheting between the operational and non-operational conditions. The cam 36 can be located about a peripheral edge of either or both of the independent lever arm rails 80, 82 and can rotate together therewith. Thus, when the lever arm 18 is rotated from the second position 28 (FIG. 5) to the third position 30 (FIG. 6), the cam 36, 36' can engage a portion of the lock member 62, such as the lock member arms 64, and push the lock member 62 away from the ratchet teeth 54, 54' so as to disengage the lock member arms 64 therefrom. As such, by rotating the lever arm 18 to the third position 30, the lock member 62 can be thereby disengaged from the ratchet teeth 54, 54' to place the means for ratcheting in the non-operational condition to permit the dynamic webbing 12 to be unwound from the reel 14.

Because it can be undesirable for the tie-down device 10 to release the dynamic webbing 12 unexpectedly, a stop 66 or the like can be provided to inhibit the movement of the lever arm 18 from the second position 28 to the third position 30. In one example, the main body portion 16 can include the stop 66. The rotational lock element 38 attached to the lever arm 18 can also be resiliently biased into engagement with the stop 66 to thereby inhibit movement of the lever arm 18 from the second to the third position 28, 30. For example, each side of the main body portion 16 can include a stop 66 for engagement with one of the pair of rotational lock arms 58 of the rotational lock element 38. The one or more springs 60 can bias the rotational lock element 38 towards the stop 66. Thus, to overcome the stops 66 and move the lever arm 18 to the third position 30, a user can pull the rotational lock element 38, such as by one or more of the handles 78a, 78b, against the biasing force of the spring 60 to lift the rotational lock arms 58 over the stops 66.

In addition or alternatively, the tie-down device 10 can include structure to retain the lever arm 18 in the third position 30 to facilitate unwinding of the dynamic webbing 12 from the reel 14. For example, as shown, the main body portion 16 can include one or more detents 68 spaced a distance from the stops 66. Thus, after the rotational lock arms 58 are lifted over and moved beyond the stops 66 (e.g., the lever arm 18 is moved to the third position 30), the spring 60 can bias the rotational lock arms 58 towards the detents 68. Additionally, the biasing force of the spring 60 can cause the rotational lock arms 58 to be trapped within the detents 68 until removed therefrom by a user (e.g., for movement of the lever arm 18 back to either of the first or second positions 26, 28). Further, one of the sidewalls of the detents 68 can be raised sufficiently to inhibit the rotational lock arms 58 from being lifted over the sidewall to thereby inhibit the lever arm 18 from moving into a position beyond the third position 30. When the lever arm 18 is finally moved from the third position 30 back to the first or second position 26, 28, the cam 36 can be removed from engagement with the lock member 62 (such as with the handles 78*a*, 78*b*), and the lock member 62 can automatically re-engage the ratchet wheels 52, 52'.

As stated previously, the dynamic webbing 12 is configured to wind about the reel 14 between a generally fully extended position and a generally fully retracted position. In the fully retracted position, the dynamic webbing 12 is generally completely wound about the reel 14, though it is to be appreciated that the end 13 of the dynamic webbing 12 can extend various distances from the main body portion 16. For example, as shown in FIG. 1, the end 13 can extend a relatively large distance, though it can also extend a relatively small distance, such as where the means for attaching 15 (e.g., a hook) is in contact with the main body portion 16 or even extends within the main body portion 16. The amount of extension of the end 13 can be controlled in various manners, such as by varying the sizes of the reel 14, main body portion 16, and/or thickness of the webbing 12, etc.

Additionally, the ratcheting tie-down device 10 can also include a static webbing 112 having one end 111 being attached to the main body portion 16. The static webbing 112 can be coupled to a pin or the like of the main body portion 16, or can even be looped through an aperture formed in a portion, such as the bottom, of the main body portion 16. It is to be understood that the phrase "static webbing" is intended to refer to a fixed-length webbing that is generally not selectively extendable a variable distance from the device 10. In other words, during each use of the device 10, the static webbing 112 extends generally the same distance from the main body portion 16. The other end 113 of the static webbing 112 can be attached to a second means for attaching 115 the second webbing 112 to an object, supporting surface, or the like. For example, as shown in FIG. 4, the one end 111 of the static webbing 112 can be attached to a portion of the main body portion 16 generally about the second end 23B, though other attachment points and methodologies are also contemplated. Similar to the first means for attaching 15, the second means for attaching 115 can include a hook, strap, loop, clip, magnet, hitch, or the like. Additionally, either or both of the ends 111, 113 can be either removably or non-removably connected to the main body portion 16 and second means for attaching 115, respectively, in various manners. For example, the static webbing 112 can extend through an opening, or around a pin or the like, of the main body portion 16 and then be folded over on itself and attached to another portion of the static webbing 112 in various manners, such as by adhesives, stitching, welding, or the like. Thus, when the tie-down device 10 is in use, tension can be transmitted through the dynamic and static webbings 12, 112, and the associated reel 14 and main body portion 16, though the tension may also be transmitted through other elements, such as the ratchet wheels 52 and/or lock member 62, though more or less other elements are also contemplated. In addition or alternatively, the static webbing 112 can also include structure (not shown) to provide an optional, "soft attachment" loop similar to that described with regards to the dynamic webbing 12 (i.e., loop 21, see FIG. 7).

The ratcheting tie-down device 10 can also include various other elements. For example, as shown in FIGS. 2 and 4, a first guide member 106, such as a guide pin or the like, can be secured between the sides of the main body portion 16 generally about the first end 23A. The guide member 106 can extend at least partially across the first end 23A. The first guide member 106 can help to guide the dynamic webbing 12 relative to the main body portion 16 during both winding and unwinding of the dynamic webbing 12 about the reel 14. Thus, the dynamic webbing 12 can enter the main body portion 16 through the first end 23A and be guided underneath the first guide member 106 prior to being wound about the reel 14. Although the first guide member 106 is shown as a pin having a generally circular cross-sectional area, it can also include various elements (i.e., rivets, bolts, etc.) and can have various other geometries, such as square, rectangular, triangular, polygonal, etc.

As shown, the first guide member 106 can guide the dynamic webbing 12 to travel generally underneath the first guide member 106 while being extended and/or retracted from the reel 14. Thus, the dynamic webbing 12 can be generally consistently guided towards the reel 14 so as to wind generally evenly thereon. Moreover, because the ratcheting device 10 is configured such that a user pulls the lever arm 18 generally towards the user, the first guide member 106 can act as a pivot point to stabilize the ratcheting device 10 during the reciprocating ratcheting motion. For example, when the lever arm 18 is pulled generally towards a user to wind the dynamic webbing 12 onto the reel 14, tension in the dynamic webbing 12 may stabilize the ratcheting device 10 along a generally vertically upward axis. Subsequently, when the lever arm 18 is pushed generally away from the user to reset the ratchet mechanism, the first guide member 106 can act as a pivot pin that impinges upon the dynamic webbing 12 to stabilize the ratcheting device 10 along a generally vertically downward axis. Similarly, because the first guide member 106 can maintain the dynamic webbing 12 generally below the first guide member 106 and between the walls of the main body portion 16, the ratcheting device 10 can be stabilized along a generally horizontal axis during the various phases of the reciprocating ratcheting motion.

In yet another example, keeping with FIGS. 2 and 4, a second guide member 108 can be coupled to the main body portion 16 about the first end 23A and generally adjacent the first guide member 106. The second guide member 108 can extend generally upwards such that the dynamic webbing 12 is guided to travel above the lock member 62 prior to being wound about the reel 14. In one example, as shown in FIG. 4, the second guide member 108 can be formed with the main body portion 16, such as being a portion bent generally upwards, though can also be provided as a separate element coupled thereto. In the shown example, the second guide member 108 can located generally below the first guide member 106 such that the dynamic webbing 12 can enter the main body portion 16 through the first end 23A, be guided underneath the first guide member 106, and be guided upwards above the lock member 62 prior to being wound about the reel 14. Thus, the dynamic webbing 12 can be inhibited from impinging, binding, or interfering with the operation of the lock member 62 while the reciprocating ratcheting action extend and/or retracts the dynamic webbing 12 from the main body portion 16. Similarly, the dynamic webbing 12 can protect the user's hands from the lock member 62 during operation. Additionally, because the reel 14 can be located at a vertically raised position relative to the location where the dynamic webbing 12 enters the main body portion 16, the second guide member 108 can guide the dynamic webbing 12 generally vertically upwards along a gradual angle so as to avoid binding of the webbing 12 while winding onto the reel 14.

In yet another example, the ratcheting device 10 can include a protective member 130 coupled to a portion of the main body portion 16. For example, the protective member 130 can be formed of a relatively softer material, such as plastic, rubber, or the like that can protect the various elements of the ratcheting device 10, and/or can protect external objects from the ratcheting device 10. For example, as shown in FIGS. 2 and 4, the protective member 130 can be located generally about the bottom of the main body portion 16. The protective member 130 can be removably or non-removably coupled to the main body portion 16 in various manners, such as by fasteners, adhesives, welding, etc. and/or can even be formed therewith (i.e., integrally molded with or onto, etc.).

In addition or alternatively, the protective member 130 can include various features. In one example, a front portion of the protective member 130 can include an aperture 132 for guiding the dynamic webbing 12 into and out of the ratcheting device 10. The aperture 132 can be located to facilitate guiding the dynamic webbing 12 underneath the first guide member 106. In another example, as shown in FIG. 7, the protective member 130 can include the second guide member 134, in addition to or as an alternative to the aforedescribed second guide member 108 (i.e., see FIG. 4). For example, the bottom of the main body portion 16 can include a hole, and a generally ramped portion of the protective member 130 can extend through the hole and provide the second guide member 134. As the protective member 130 can be formed of a generally softer material (i.e., plastic, rubber, etc.) and can be molded, the second guide member 134 can be provided with additional and/or different features, such as various surface features, guiding features, etc. to facilitate guiding of the dynamic webbing 12. In yet another example, the protective member 130 can include a third guide member 136 configured to further guide the dynamic webbing 12 underneath the first guide member 106. For example, the third guide member 136 can be located generally above the aperture 132 such that the dynamic webbing 12 is generally inhibited from extending above the first guide member 106.

Figure 8:
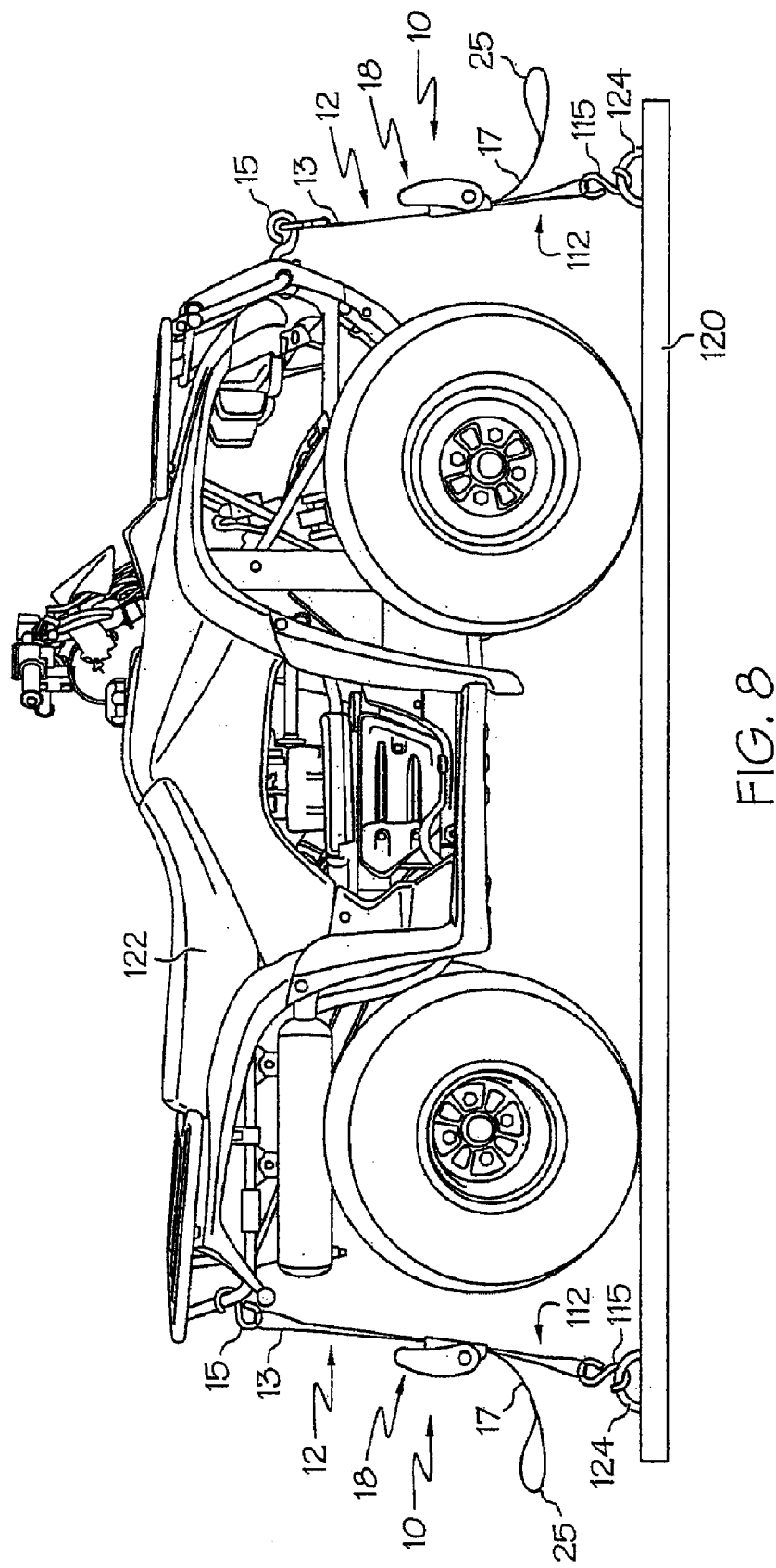
FIG. 8 is a side view of an example application for the ratcheting tie-down device of FIG. 1.

Turning now to the shown example of FIG. 8, an example use for the ratcheting tie-down device 10 is illustrated schematically in accordance with an aspect of the present invention. In the shown example, the ratcheting tie-down device 10 is attached between a supporting surface 120 and a vehicle 122 to secure the vehicle 122 to the supporting surface 120. The dynamic webbing 12 can be selectively extended a variable distance from the device 10 as required for coupling the vehicle 122. For example, the hooks 15, 115 of the tie-down devices 10 can be attached at one end to the vehicle 122, and at the other end to anchors 124 secured to the supporting surface 120. Similarly, the other end 17 of the webbing 12 can extend through the reel 14 and be grasped by a user to inhibit the hooks 15, 115 from inadvertently disconnecting from the vehicle 122 or anchors 124. As shown, the vehicle 122 can include an all-terrain vehicle (ATV's) and the supporting surface 120 can include a trailer, truck bed, or the like, though the ratcheting tie-down device 10 can also be used with various other wheeled and non-wheeled vehicles to various other supporting surfaces. For example, the device 10 can be used with cars, trucks, boats, motorcycles, bicycles, agricultural equipment, trailers, containers, and/or the like. In addition or alternatively, the ratcheting tie-down device 10 can also be used to secure various other wheeled or non-wheeled objects, equipment, cargo, or the like to various other objects, equipment, cargo, supporting surfaces, etc. Further still, a plurality of tie-down devices 10 can be attached together in series (e.g., end-to-end attachment via the hooks) to provide a greater length tie-down for use with relatively larger objects, equipment, etc.

The invention has been described with reference to various example embodiments. Obviously, modifications and alterations will occur to others upon a reading and understanding of this specification. It is intended to include all such modifications and alterations insofar as they come within the scope of the appended claims or the equivalents thereof.

What is claimed is:

1. A ratcheting tie-down device, including:
a main body portion having a first end and a second end, a bottom portion and two sides, and an attachment portion that is integrally formed with the bottom portion about the second end so that the attachment portion extends from the bottom portion and between the two sides;
a reel for rotation relative to the main body portion about an axis, the reel being located about the second end of the main body portion;
a dynamic webbing for winding about the reel, the dynamic webbing being extendable from the first end of the main body portion;
means for attaching at least one end of the dynamic webbing to an object;
means for ratcheting rotation of the reel to wind the dynamic webbing onto the reel, the means for ratcheting having an operational condition in which ratcheting rotation can occur and a non-operational condition in which ratcheting rotation cannot occur;
a static webbing coupled to the attachment portion of the main body portion about the second end; and
a first guide member coupled to the main body portion about the first end and extending at least partially across the first end such that the dynamic webbing travels underneath the first guide member prior to being wound about the reel;
wherein the ratcheting tie-down device is configured so that the means for ratcheting must be rotated towards the attachment portion for ratcheting rotation to occur.

2. The ratcheting tie-down device of claim 1, wherein the means for ratcheting includes a lever arm rotatable relative to the main body portion about the reel axis, the lever being rotatable between a first position and a second position to cause the ratcheting rotation of the reel, and wherein the lever arm is rotatable to a third position to place the means for ratcheting in the non-operational condition.

3. The ratcheting tie-down device of claim 2, wherein the lever arm includes at least a pair of independent lever arm rails that are each independently coupled to the reel.

4. The ratcheting tie-down device of claim 3, wherein the pair of independent lever arm rails are coupled together at an end spaced a distance from the reel.

5. The ratcheting tie-down device of claim 3, wherein the main body portion includes a stop and the lever arm includes a rotational lock element engagable with the stop for inhibiting rotation of the lever arm to the third position.

6. The ratcheting tie-down device of claim 5, wherein each of the pair of independent lever arm rails includes a guide channel, the guide channels being arranged to retain the rotational lock element to permit longitudinal movement thereof.

7. A ratcheting tie-down device, including:
a main body portion having a first end and a second end;
a reel for rotation relative to the main body portion about an axis, the reel being located about the second end of the main body portion;

a dynamic webbing for winding about the reel, the dynamic webbing being extendable from the first end of the main body portion;

means for attaching at least one end of the dynamic webbing to an object;

means for ratcheting rotation of the reel to wind the dynamic webbing onto the reel, the means for ratcheting having an operational condition in which ratcheting rotation can occur and a non-operational condition in which ratcheting rotation cannot occur;

a static webbing coupled to the main body portion about the second end;

a first guide member coupled to the main body portion about the first end and extending at least partially across the first end such that the dynamic webbing travels underneath the first guide member prior to being wound about the reel; and a lever arm rotatable relative to the main body portion about the reel axis, the lever being rotatable between a first position and a second position to cause the ratcheting rotation of the reel, wherein the lever arm is rotatable to a third position to place the means for ratcheting in the non-operational condition and wherein the lever arm includes at least a pair of independent lever arm rails that are each independently coupled to the reel;

wherein the main body portion includes a stop and the lever arm includes a rotational lock element engagable with the stop for inhibiting rotation of the lever arm to the third position, the lever arm also including guide channels that are arranged to retain the rotational lock element to permit longitudinal movement thereof; and wherein each of the pair of independent lever arm rails includes a pocket and a biasing element maintained in the pocket, each biasing element biasing the rotational lock element towards the stop.

8. The ratcheting tie-down device of claim 5, wherein the rotational lock element extends generally along a longitudinal axis and includes a plurality of handles at one end thereof, at least two of the handles extending generally away from each other and at an angle, respectively, relative to the longitudinal axis.

9. The ratcheting tie-down device of claim 1, wherein the means for ratcheting further includes a plurality of ratchet teeth rotatable about the reel axis and the means for ratcheting further includes a lock member that is selectively movable between locking engagement with at least one ratchet tooth of the ratchet wheel and disengagement from the ratchet wheel upon a change between the operational condition and the non-operational condition, respectively, of the means for ratcheting.

10. The ratcheting tie-down device of claim 9, further including a second guide member disposed adjacent the first guide member and extending generally upwards relative to the main body portion, the second guide member being configured to guide the dynamic webbing to travel above the lock member prior to being wound about the reel.

11. A ratcheting tie-down device, including:
a main body portion including a first end and a second end, a bottom portion and two sides, and an attachment portion that is integrally formed with the bottom portion about the second end so that the attachment portion extends from the bottom portion and between the two sides;

a reel rotatable relative to the main body portion about an axis, the reel being located about the second end of the main body portion;

a dynamic webbing windable about the hub, the dynamic webbing being extendable from the first end of the main body portion;

means for attaching at least one end of the dynamic webbing to an object;

a static webbing secured to the attachment portion of the main body portion about the second end;

a ratchet wheel having a plurality of ratchet teeth, the ratchet wheel being rotatable relative to the main body portion about the reel axis; and a lever arm rotatable relative to the main body portion about the reel axis between a first position and a second position to cause ratcheting rotation of the ratchet wheel, wherein the lever arm includes at least a pair of independent lever arm rails that are each independently coupled to the reel, and the pair of independent lever arm rails are coupled together at an end spaced a distance from the reel;

wherein the ratcheting tie-down device is configured so that the lever arm must be rotated towards the attachment portion for ratcheting rotation to occur.

12. The ratcheting tie-down device of claim 11, further including a lock member that is resiliently biased into locking engagement with at least one ratchet tooth of the plurality of ratchet teeth to inhibit unwinding of the webbing about the hub.

13. The ratcheting tie-down device of claim 12, wherein at least one of the pair of independent lever arm rails further includes a cam, the lever arm being further rotatable between the second position and a third position, rotation of the lever arm to the third position causing the cam to engage the lock member to thereby disengage the lock member from the at least one ratchet tool to permit unwinding of the dynamic webbing about the reel.

14. The ratcheting tie-down device of claim 11, wherein the main body portion includes a stop and the lever arm includes a rotational lock element engagable with the stop for inhibiting rotation of the lever arm between the second position and a third position, and wherein each of the pair of independent lever arm rails includes a guide channel, the guide channels being arranged to retain the rotational lock element to permit longitudinal movement thereof.

15. The ratcheting tie-down device of claim 14, wherein each of the pair of independent lever arm rails includes a pocket and a biasing element maintained in the pocket, each biasing element biasing the rotational lock element towards the stop.

16. The ratcheting tie-down device of claim 11, further including a first guide member coupled to the main body portion about the first end and extending at least partially across the first end such that the dynamic webbing travels underneath the first guide member prior to being wound about the reel.

17. A ratcheting tie-down device, including:
a main body portion having a first end and a second end, a bottom portion and two sides, and an attachment portion that is integrally formed with the bottom portion about the second end so that the attachment portion extends from the bottom portion and between the two sides;

a reel for rotation relative to the main body portion about an axis, the reel being located about the second end of the main body portion;

a dynamic webbing for winding about the reel, the dynamic webbing being extendable from the first end of the main body portion;

means for attaching one end of the dynamic webbing to an object, wherein the other end of the dynamic webbing includes a handle for grasping by a user;

means for ratcheting rotation of the reel to wind the dynamic webbing onto the reel, the means for ratcheting having an operational condition in which ratcheting rotation can occur and a non-operational condition in which ratcheting rotation cannot occur;

a static webbing coupled to the attachment portion of the main body portion about the second end; and a lever arm including a grip portion and being rotatable relative to the main body portion about the reel axis between a first position and a second position to cause ratcheting rotation of the means for ratcheting, wherein the lever arm includes at least a pair of independent lever arm rails that are coupled together about the grip portion, and wherein each of the independent lever arm rails are independently coupled to the reel;

wherein the ratcheting tie-down device is configured so that the means for ratcheting must be rotated towards the attachment portion for ratcheting rotation to occur.

18. The ratcheting tie-down device of claim 17, wherein the main body portion includes a stop and the lever arm includes a rotational lock element engagable with the stop for inhibiting rotation of the lever arm between the second position and a third position, wherein each of the pair of independent lever arm rails further includes a guide channel, the guide channels being arranged to retain the rotational lock element to permit longitudinal movement thereof, and wherein each of the pair of independent lever arm rails includes a pocket and a biasing element maintained in the pocket, each biasing element biasing the rotational lock element towards the stop.

19. The ratcheting tie-down device of claim 17, further including:

a first guide member coupled to the main body portion about the first end and extending at least partially across the first end such that the dynamic webbing travels underneath the first guide member prior to being wound about the reel, and a second guide member disposed adjacent the first guide member and extending generally upwards relative to the main body portion, the second guide member being configured to guide the dynamic webbing to travel above the lock member prior to being wound about the reel.

20. The ratcheting tie-down device of claim 17, wherein the means for attaching one end of the dynamic webbing to an object includes a hook, and corresponding attachment structure coupled to the dynamic webbing and spaced a distance from the one end, the hook being configured to be coupled to the corresponding attachment structure to form a loop generally about the one end of the dynamic webbing.

* * * * *